(12) United States Patent
Arhab et al.

(10) Patent No.: US 7,191,879 B2
(45) Date of Patent: Mar. 20, 2007

(54) HYDROKINETIC COUPLING APPARATUS AND METHOD FOR MOUNTING SAME

(75) Inventors: Rabah Arhab, Saint-Brice-Sous-Forêt (FR); Norberto Termenon, Amiens (FR)

(73) Assignee: Valeo Embrayages, Amiens Cedex (FR)

( * ) Notice: Subject to any disclaimer, the term of this patent is extended or adjusted under 35 U.S.C. 154(b) by 169 days.

(21) Appl. No.: 10/507,844

(22) PCT Filed: Mar. 21, 2003

(86) PCT No.: PCT/FR03/00902

§ 371 (c)(1),
(2), (4) Date: Jan. 27, 2005

(87) PCT Pub. No.: WO03/081086

PCT Pub. Date: Oct. 2, 2003

(65) Prior Publication Data

US 2005/0121278 A1 Jun. 9, 2005

(30) Foreign Application Priority Data

Mar. 22, 2002 (FR) .................................. 02 03658

(51) Int. Cl.
*F16H 45/02* (2006.01)

(52) U.S. Cl. .................. 192/3.29; 192/70.17; 192/212; 29/889.5

(58) Field of Classification Search ...................... None
See application file for complete search history.

(56) References Cited

U.S. PATENT DOCUMENTS

| 4,194,604 | A | * | 3/1980 | Nichols et al. | ............... | 192/3.3 |
| 4,944,374 | A | * | 7/1990 | Casse et al. | ............... | 192/3.29 |
| 5,996,750 | A | * | 12/1999 | Roshangar | ................. | 192/3.29 |
| 6,193,037 | B1 | | 2/2001 | Middelmann et al. | | |
| 6,298,965 | B1 | | 10/2001 | Krause et al. | | |
| 2002/0027053 | A1* | | 3/2002 | Back et al. | .................. | 192/3.3 |
| 2003/0074791 | A1* | | 4/2003 | Yamanaka et al. | ......... | 29/889.5 |

FOREIGN PATENT DOCUMENTS

| DE | 3708106 A1 * | 9/1988 |
| FR | 2 797 013 | 2/2001 |
| GB | 2 271 411 A | 4/1994 |

\* cited by examiner

*Primary Examiner*—Richard M. Lorence
(74) *Attorney, Agent, or Firm*—Berenato, White & Stavish (57) ABSTRACT

A coupling apparatus for a motor vehicle, including a hub designed to link in rotation an output shaft and a turbine wheel a clutch for locking the coupling between the input shaft and output shaft. A locking piston is axially mobile between a wall integral with the turbine wheel and a wall for locking a crankcase designed rotatable link the input shaft and an impeller wheel. A female member of sealing mechanism, linked to the piston axially about a male member of the sealing mechanism, linked to the hub. A damping mechanism is clamped between the piston and the wall and an output member linked to the hub. The male member and the damping output member are each mounted on the hub or born by a member mounted on the hub.

27 Claims, 6 Drawing Sheets

HYDROKINETIC COUPLING APPARATUS AND METHOD FOR MOUNTING SAME

The present invention relates to a hydrokinetic coupling apparatus and a method of assembling the said apparatus.

In particular, it is applicable to an automatic transmission for a motor vehicle.

In the state of the art it is known, in particular from FR-A-2 797 013 (FR-99 09740), to provide hydrokinetic coupling apparatus for coupling together two shafts, namely a driving shaft and a driven shaft, in particular for a motor vehicle, and being of the type comprising:

a casing adapted to couple the driving shaft in rotation to an impulse wheel,
a hub adapted to couple the driven shaft in rotation with a turbine wheel,
a lock-up clutch for locking together the coupling of the driving and driven is shafts, and comprising:
a movable locking piston which is displaceable axially between a wall fixed with respect to the turbine wheel and a substantially radial locking wall of the casing, against which the piston is biased for locking the coupling,
sealing means between two hydraulic chambers which are separated by the piston, the sealing means having a female member, coupled to the piston and sliding axially around a complementary male member which is coupled to the hub,
a friction disc adapted to be gripped between the piston and the locking wall,
and circumferential damping means which are provided with a damping input member coupled to the friction disc, and with a damping output member which is coupled to the hub.

Conventionally, the turbine wheel is driven by the impulse wheel by virtue of the flow of a fluid contained in the casing.

In the case of an automatic transmission for a motor vehicle, the driving shaft is the output shaft of the engine of the vehicle, while the driven shaft is coupled to means for changing gear. After the vehicles have been started, the lock-up clutch enables the sliding movement between the turbine and impulse wheels to be controlled by controlling the drive through the driven shaft, coupled to the turbine wheel, of the driving shaft coupled to the casing. This control of the driving of the shafts is achieved by gripping the friction disc arranged between the piston and the locking wall of the casing.

In FR-A-2 797 013, the damping output member has a generally annular form, and includes a central aperture through which it is fitted over the hub. The damping output member is coupled in rotation to the hub by means of axial splines, which are formed on the contour of the damping member that delimits the fitting aperture, and these splines are in cooperation with complementary axial splines formed on the hub.

Moreover, in FR-A-2 797 013, the male member of the sealing means is formed integrally with the hub, and defines a shoulder of the hub which projects radially with respect to the splines of the hub, which cooperate with the complementary splines on the damping output member.

The shoulder which is defined by the male member of the sealing means constitutes an obstacle which hinders the passage of certain tools used in machining the splines on the hub. As a result of this, machining of the splines of the hub is relatively complex to perform, and this increases the manufacturing cost of the hydrokinetic coupling apparatus.

An object of the invention is to propose a hydrokinetic coupling apparatus of the type set forth above, in which the male member of the sealing means and the means for coupling the damping output member in rotation with the hub are less costly and are easy to make.

To this end, the invention provides a hydrokinetic coupling apparatus of the type set forth above, characterised in that each of the male member of the sealing means and the damping output member is attached on the hub or carried by a member attached on the hub.

In accordance with features of various embodiments of the said hydrokinetic coupling apparatus:
the male member of the sealing means is fixed, firstly to a wall delimiting the turbine wheel, and secondly to the hub;
the male member of the sealing means is fixed to the wall delimiting the turbine wheel and to the hub by welded joints, in particular of the type made by friction welding;
the male member of the sealing means constitutes a substantially axial extension of a wall that delimits the turbine wheel, the said extension being formed integrally with the turbine wheel wall and fixed to the hub;
the substantially axial extension of the wall that delimits the turbine wheel is fixed to the hub by a welded joint, in particular of the type made by friction welding;
the male member of the sealing means is carried by a substantially axial extension of a wall delimiting the turbine wheel, the said extension being fixed to the hub;
the male member of the sealing means has a generally annular form and is force-fitted or snap-fitted around the substantially axial extension of the wall that delimits the turbine wheel;
the substantially axial extension of the wall delimiting the turbine wheel is fixed to the hub by a welded joint, in particular of the type made by friction welding;
the male member of the sealing means is formed on the peripheral edge of a plate portion, referred to as a plate connected to the hub, which has the general form of a body of revolution and which includes a central aperture for fitting over the hub;
the plate connected to the hub is coupled in rotation to the said hub by means of axial splines formed on the contour of the plate portion delimiting the fitting aperture, the said splines co-operating with complementary axial splines formed on the hub;
the damping output member has the general form of a body of revolution and has a central aperture for fitting over the hub, the damping output member being coupled in rotation to the hub and immobilised axially with respect to the said hub by means formed integrally with the damping output member and hub;
the plate connected to the hub is immobilised axially with respect to the said hub, firstly by means of an axial abutment which is for example defined by an elastic ring carried by the hub, in cooperation with a first face of the plate connected to the hub, and secondly, by means formed integrally with the hub and participating in the axial immobilisation of the damping output member with respect to the said hub;
it comprises sealing means, in particular an O ring, interposed axially between the plate connected to the hub and the damping output member;
the plate connected to the hub is coupled in rotation to the hub and is immobilised axially with respect to the hub by means which are formed integrally with the plate and hub;
the damping output member has a generally annular form and includes a central fitting aperture for fitting over the hub, the output damping member being coupled in rotation to the hub by means of axial splines, which are formed on the contour of the damping member which delimits the fitting aperture, the said splines co-operating with complementary axial splines formed on the hub;

it includes a friction abutment interposed between the wall which is fixed with respect to the turbine wheel and the piston;

the male member of the sealing means is formed with a rebate for centring the friction abutment with respect to the substantially axial extension;

the friction abutment is formed integrally with the male member of the sealing means;

the friction abutment is fixed on the wall which is fixed to the turbine wheel;

the circumferential damping means comprise springs working circumferentially and co-operating, firstly, with at least one annular abutment element which is referred to as the damping input engagement element, for abutment by the springs and fixed with respect to the damping input member, and, secondly, with an annular abutment element which is referred to as the damping output engagement element, for abutment by the springs and fixed with respect to the damping output member;

the damping input engagement element constitutes an extension of the friction disc;

the damping output engagement element constitutes the damping output member;

the input abutment element and the damping output element are formed with complementary angular abutment elements for limiting relative angular travel;

the male member of the sealing means carries a sealing liner, for example a sealing segment with radial elastic action, which is lodged in an annular groove of the male member.

The invention also provides a method for assembly of a hydrokinetic coupling apparatus as defined above, characterised in that the circumferential damping means and piston are first fitted in the casing, and an assembly is then fitted which comprises the turbine wheel, the male member of the sealing means, and the hub, by telescopic engagement of the latter with the damping output member.

The invention also provides a method for assembly of a hydrokinetic coupling apparatus as defined above, characterised in that the circumferential damping means is first mounted in the casing with the hub coupled to the damping output member and the piston, and an assembly is then fitted which comprises the turbine wheel and the male member of the sealing means, by telescopic engagement of the said assembly with the hub.

The invention will be understood more clearly on a reading of the following description, which is given by way of example only and with reference to the drawings, in which.

Figure 1:
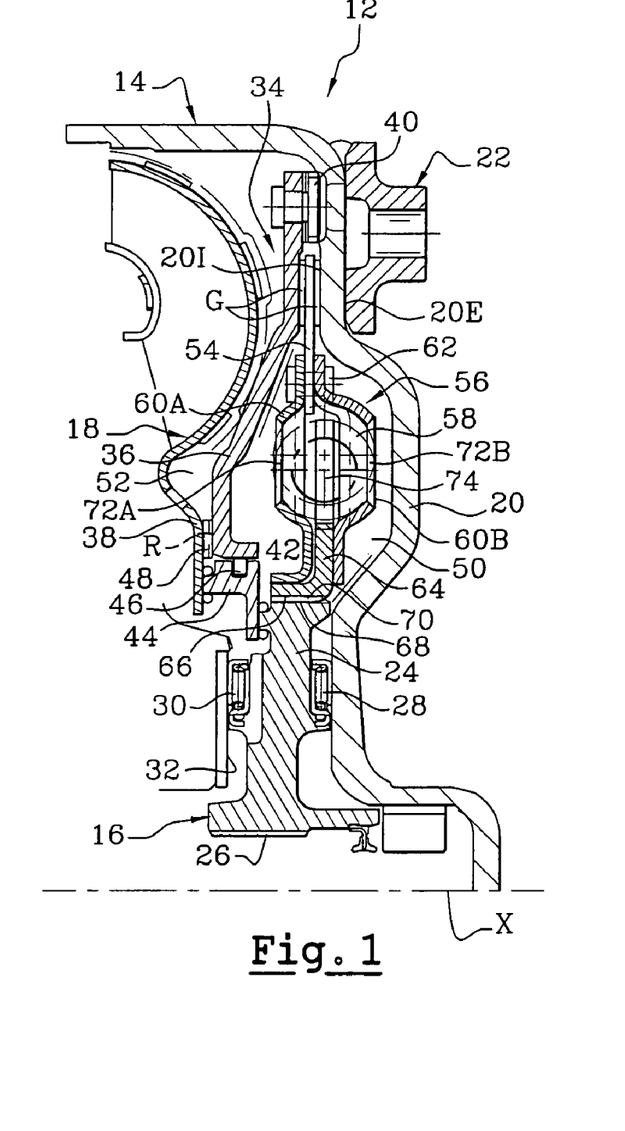
FIG. 1 is a half view in axial cross section of a hydrokinetic coupling apparatus in a first embodiment of the invention.

FIG. 1 shows a hydrokinetic coupling apparatus in a first embodiment of the invention, designated by the general reference 12. The apparatus 12 is adapted to couple together two shafts, namely a driving shaft and a driven shaft (not shown in the drawings), for example in an automatic transmission for a motor vehicle. In that case, the driving shaft is the output shaft of the engine of the vehicle and the driven shaft is connected to means for changing gear.

In the conventional way, the hydrokinetic coupling apparatus 12 comprises a casing 14 which is arranged to couple together in rotation the driving shaft and an impulse wheel. The impulse wheel, which is known per se, is not shown in the drawings.

The apparatus 12 further includes a hub 16 having an axis X, which is arranged to couple together in rotation the driven shaft and a turbine wheel 18. In the following description, axial and radial orientations will be considered with respect to the axis X of the hub 16.

The casing 12 has a substantially radial wall 20, which is referred to as a locking wall and which is provided with a surface 20E outside the casing, which carries conventional means 22 for coupling it with the driving shaft.

The hub 16, which is provided with a substantially radial plate portion 24, is arranged to be coupled to the driven shaft by engagement of complementary axial splines 26 formed on the latter.

The hub 16 is immobilised axially by axial abutments with conventional rolling bearings 26, 28 which are interposed between the plate portion 24 of the hub and, firstly, the locking wall 20 of the casing, and secondly, another substantially radial wall 32 which is fixed axially.

The hydrokinetic coupling apparatus 12 also includes a lock-up clutch 34 for locking the coupling between the driving and driven shafts. This clutch 34 is activated after starting of the vehicle and hydraulic coupling of the driving and driven shafts have been effected.

In the usual way, the clutch 34 includes a movable locking piston 36, which is displaceable axially between a wall 38 which is fixed with respect to the turbine wheel 18 and the locking wall 20. In the example shown, the wall 38 delimits the turbine wheel 18.

The piston 36 is arranged to be biased against the locking wall 20 of the casing 14, so as to lock up the coupling between the shafts or to control sliding movement between the turbine and impulse wheels.

The piston 36 is coupled in rotation to the locking wall 20 of the casing by conventional means. These coupling means comprise flexible tongues 40, oriented tangentially and spaced apart circumferentially. The tongues 40 are connected at their ends to the piston 36 and to the locking wall 20 of the casing, so that by elastic deformation of the tongues they enable the piston 36 to be displaced axially. It will be noted that the tongues 40 contribute to centring of the piston 36 about the axis X.

The clutch 34 includes sealing means between two hydraulic chambers separated by the piston 36, which will be described later herein. These sealing means comprise a female member 42, which is connected to the piston and is arranged for axial sliding movement around a complementary male member 44, which is formed separate from the hub 16 and is connected to the plate portion 24 of the hub 16. The male member 44 carries a conventional sealing liner, for example an elastic radial sealing segment 46 mounted in an annular groove on the male member 44. The female member 42 is in sliding cooperation with the segment 46.

In the first embodiment of the invention, the female member 42 is defined by a central annular extension of the piston 36, which extends substantially axially, while the male member 44 is fixed, firstly to the wall 38 which delimits the turbine wheel, and secondly to the plate portion 24 of the hub 16. The male member 44 is thus interposed axially between the wall 38 and plate portion 24.

Preferably, the male member 44 of the sealing means is fixed to the wall 38 and to the plate portion 24 by a welded joint, in particular of the type which is made by friction welding.

It will be noted that an annular friction abutment 48 is interposed between the wall 38 delimiting the turbine wheel and the piston 36. This friction abutment 48 serves as a member for engagement of the piston 36 on the wall 38 that delimits the turbine wheel, when the clutch 34 is disengaged.

The friction abutment 48 is preferably made in a material chosen among synthetic thermoplastic or thermosetting materials, mixtures of synthetic materials, these materials being reinforced or not by fibres such as fibres of glass, aramides (in particular those sold under the name KEVLAR), or carbon. The friction abutment 48 may also be made in a metallic material which is adapted for the friction, for example sintered bronze.

Preferably, at least one lubricating groove R is formed in the friction abutment 48, whereby to facilitate sliding movement of the piston 36 on the abutment 48.

The piston 36 and the sealing liner 46 are adapted to separate a hydraulic control chamber 50 for controlling the lock-up clutch 34 from a hydraulic converter chamber 52 in which the turbine wheel 18 lies.

The control chamber 50, which is bounded in particular by the radial wall 20 of the casing and the piston 36, is supplied with oil under pressure by a conventional hydraulic circuit.

The lock-up clutch 34 is of the dual friction face type, in which a friction disc 54 is adapted to be gripped between the piston 36 and a surface 201 of the wall 20 inside the casing. The friction disc 54, which is interposed between the piston 36 and the locking wall 20, includes friction liners G which are arranged on its two opposed faces in the well-known way.

The friction disc 54 is coupled to the plate portion 24 of the hub 16 by circumferential damping means 56.

The circumferential damping means 56 comprise circumferentially acting springs 58 which are carried by guide rings 60A, 60B. If necessary, a supplementary spring is mounted inside at least some of the springs 58 so that, in the well-known way, they increase the stiffness of the damping means 56 under certain working conditions.

The guide rings 60A, 60B, which are coaxial with the friction disc 54, are fixed with respect to the latter by conventional means which, for example, consist of rivets 62.

The guide rings 60A, 60B connected to the friction disc 54 constitute an input damping member for the means 56.

The circumferential damping means 56 also include a damper plate 64 of generally annular form which is formed with a central aperture 66 for fitting on the plate portion 24 of the hub 16.

The damper plate 64 is coupled in rotation to the plate portion 24 by means of axial splines 68 which are formed on the contour of the damper plate 64 that defines the fitting aperture 66, and which cooperate with complementary axial splines 70 formed on the periphery of the plate portion 24 of the hub 16. The damper plate 64 thus constitutes a damping output member for the means 56.

It will be noted that the splines 70 formed on the plate portion 24 of the hub are located radially inwards, that is to say towards the axis X, with respect to the male member 44 of the sealing means. However, the said axial splines 70 are formed before the male member 44 is fastened on the plate portion 24. As a result of this, the axial splines 70 of the plate portion 24 are easy to make with the aid of tools which are displaceable axially without meeting any obstacles at the ends of the splines 70.

The circumferentially acting springs 58 are mounted in windows 72A, 72B which are in substantially facing relationship to each other and which are formed in the guide rings 60A, 60B. The damper plate 64 is formed with peripheral lugs 74 which are arranged to cooperate with the circumferentially acting springs 58.

It will therefore be understood that the guide rings 60A, 60B and the damper plate 64 constitute annular abutment elements for the springs 58.

Thus, following the conventional operation of the circumferential damping means 56, the guide rings 60A, 60B are arranged to oscillate in a damped mode with respect to the damper plate 64, about an axis which is common to these rings and the damper plate.

Figure 2:
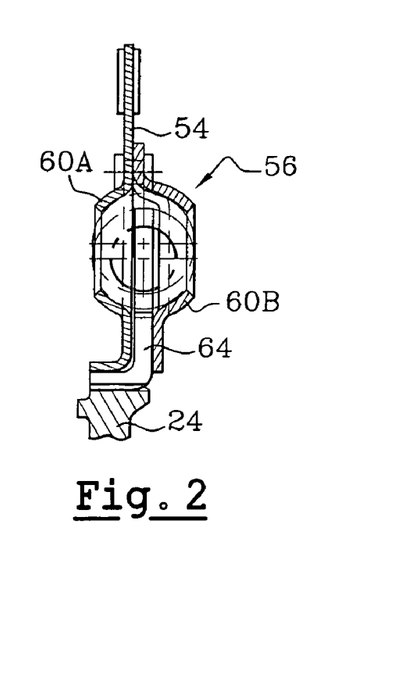
FIG. 2 is a scrap view similar to FIG. 1, but showing a modified embodiment of the circumferential damping means of the hydrokinetic coupling apparatus according to the invention.

FIG. 2 shows a modified embodiment of the circumferential damping means 56. In this version, one of the guide rings, 60A, which constitutes an damping input abutment element (for abutment by the springs 58), consists of an extension of the friction disc 54.

FIGS. 3 to 9 show a hydrokinetic coupling apparatus 12 in other embodiments of the invention. In these Figures, those elements which are similar to those in FIG. 1 are designated with identical references.

Figure 3:
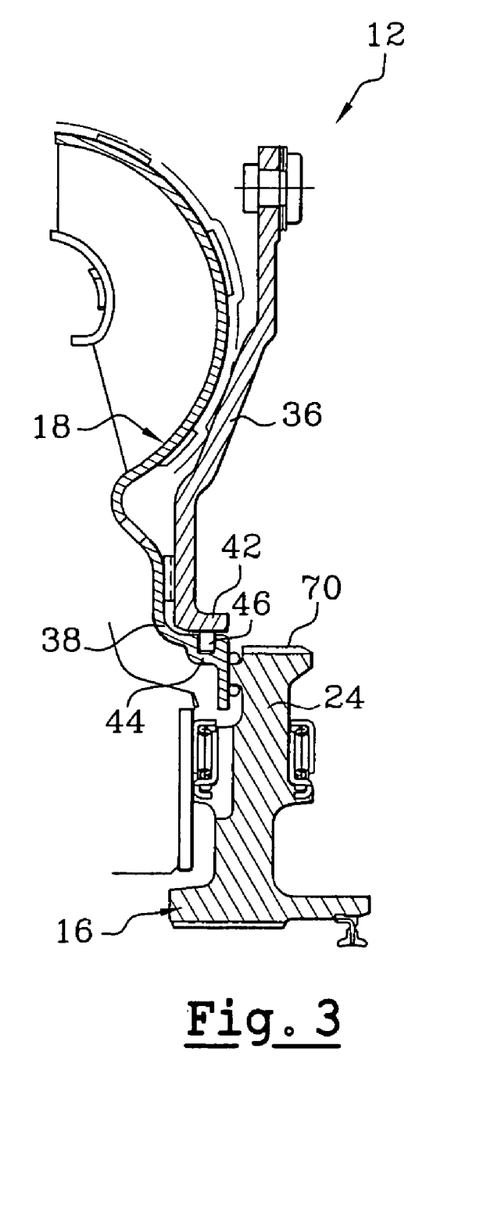
FIG. 3 is a partial view similar to FIG. 1, but showing a hydrokinetic coupling apparatus in a second embodiment of the invention.

FIG. 3 shows a hydrokinetic coupling apparatus 12 in a second embodiment of the invention.

In this case, the male member 44 of the sealing means constitutes a substantially axial extension of the wall 38 delimiting the turbine wheel 18. This axial extension, which is formed unitarily with the wall 38, is fixed to the plate portion 24 of the hub, preferably by welding and in particular by friction welding. The groove in which the sealing segment 46 is fitted is for example formed by flow turning.

Figure 4:
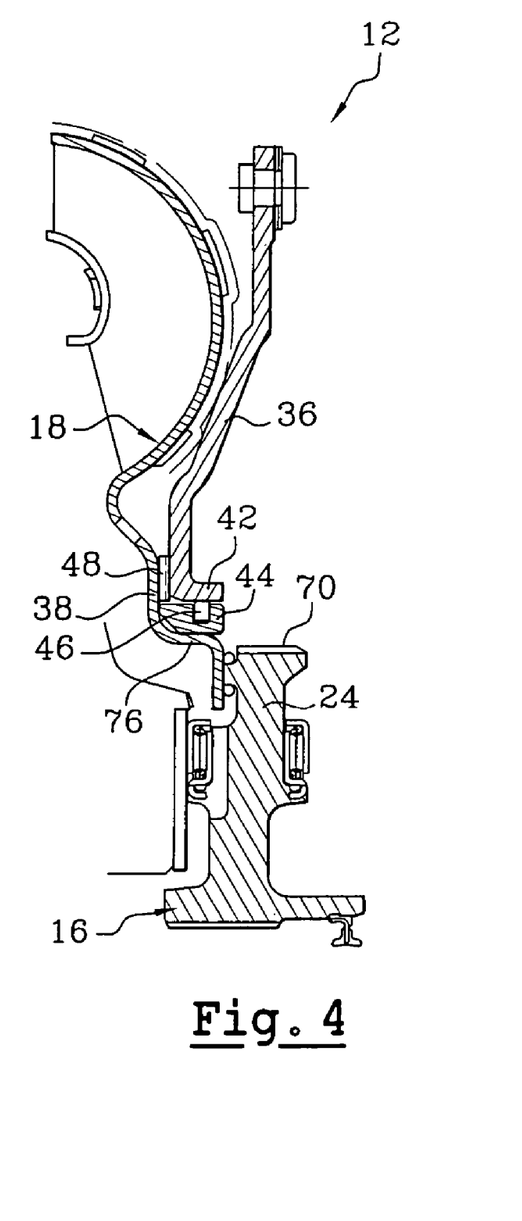
FIG. 4 is a partial view similar to FIG. 1 of a hydrokinetic coupling apparatus in a third embodiment of the invention.

FIG. 4 shows a hydrokinetic coupling apparatus in a third embodiment of the invention.

In this case, the male member 44 of the sealing means is carried by a substantially axial extension 76 of the wall 38 which defines the turbine wheel 18. This extension 76, which is accordingly made integral with the turbine wheel 38, is fixed on the plate portion 24 of the hub, preferably by welding and in particular by friction welding.

The male member 44 is of generally annular form and is force-fitted or snap-fitted around the extension 76.

If necessary, the male member 44 is made in a synthetic material which may or may not be similar to that of the friction abutment 48.

Figure 5:
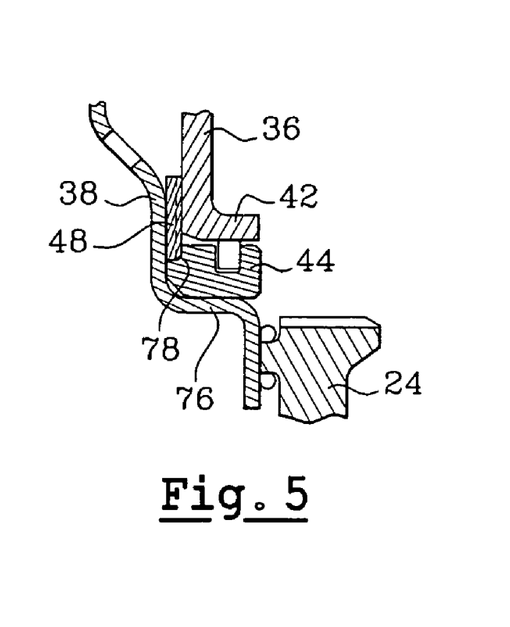
FIGS. 5 and 6 are partial views similar to FIG. 4, but showing modified versions the male member of the sealing means.
Figure 6:
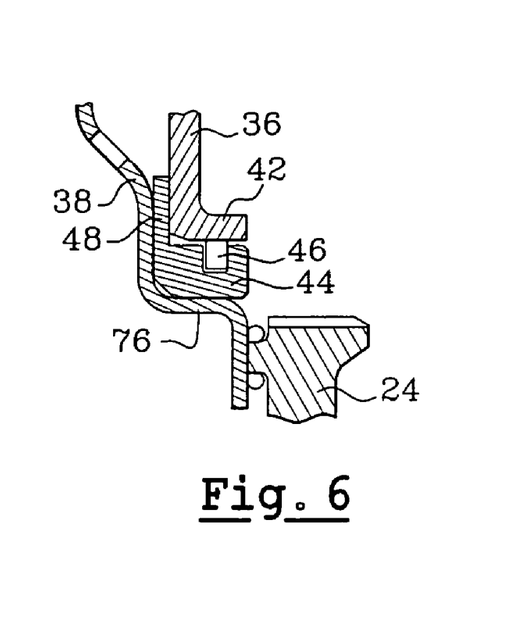

FIGS. 5 and 6 show modified embodiments of the male member 44 of the sealing means.

In the version shown in FIG. 5, the male member 44 is formed with a rebate 78 for centring the friction abutment 48 with respect to the extension 76.

In the version shown in FIG. 6, the friction abutment 48 is formed integrally with the male member 44, the latter being for example made of a synthetic material such as that referred to in the description of the first embodiment of the invention.

It will be noted that, in the second and third embodiments of the invention which are shown in particular in FIGS. 3 and 4, the axial splines 70 formed on the periphery of the plate portion 24 of the hub, located radially behind the male member 44, are easy to make due to the fact that, as explained with respect to the first embodiment of the invention, these splines 70 are formed before the male member 44 is fixed on the plate portion 24, or before the plate portion 24 is fixed on the wall carrying the male member 44.

Figures 7, 8:
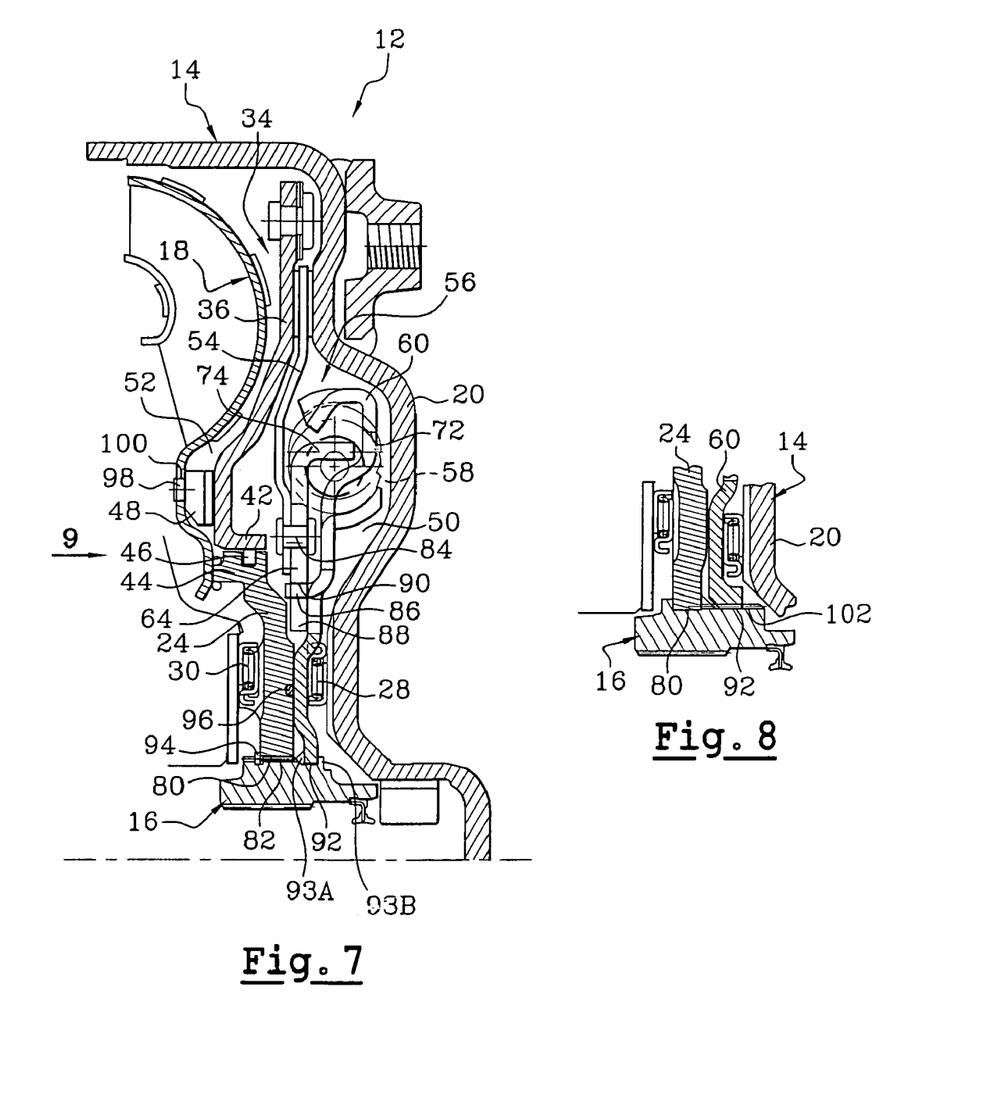
FIG. 7 is a view similar to FIG. 1 of a hydrokinetic coupling apparatus in a fourth embodiment of the invention.
FIG. 8 is a partial view similar to FIG. 7, but shows a modified version of the means connecting the hub in rotation with certain components of the hydrokinetic coupling apparatus in the fourth embodiment of the invention.

FIG. 7 shows a hydrokinetic coupling apparatus 12 in a fourth embodiment of the invention.

In this case, the plate 24 is a separate member carried on the hub 16. Thus, the male member 44 of the sealing means, formed on the peripheral edge of the plate 24, is connected to the hub 16 through the plate 24 carried on the hub 16.

In addition, in the fourth embodiment of the invention, the circumferential damping means 56 include only one guide ring 60, which has windows 72 in which the springs 58 are mounted. This guide ring 60 and the damper plate 64 together constitute the abutment elements for the springs 58. However, by contrast with the preceding embodiments, the guide ring 60 constitutes the damping output member, while the damper plate 64, coupled to the friction disc 54 by means of rivets 84, for example, constitutes the damping input member.

Figure 9:
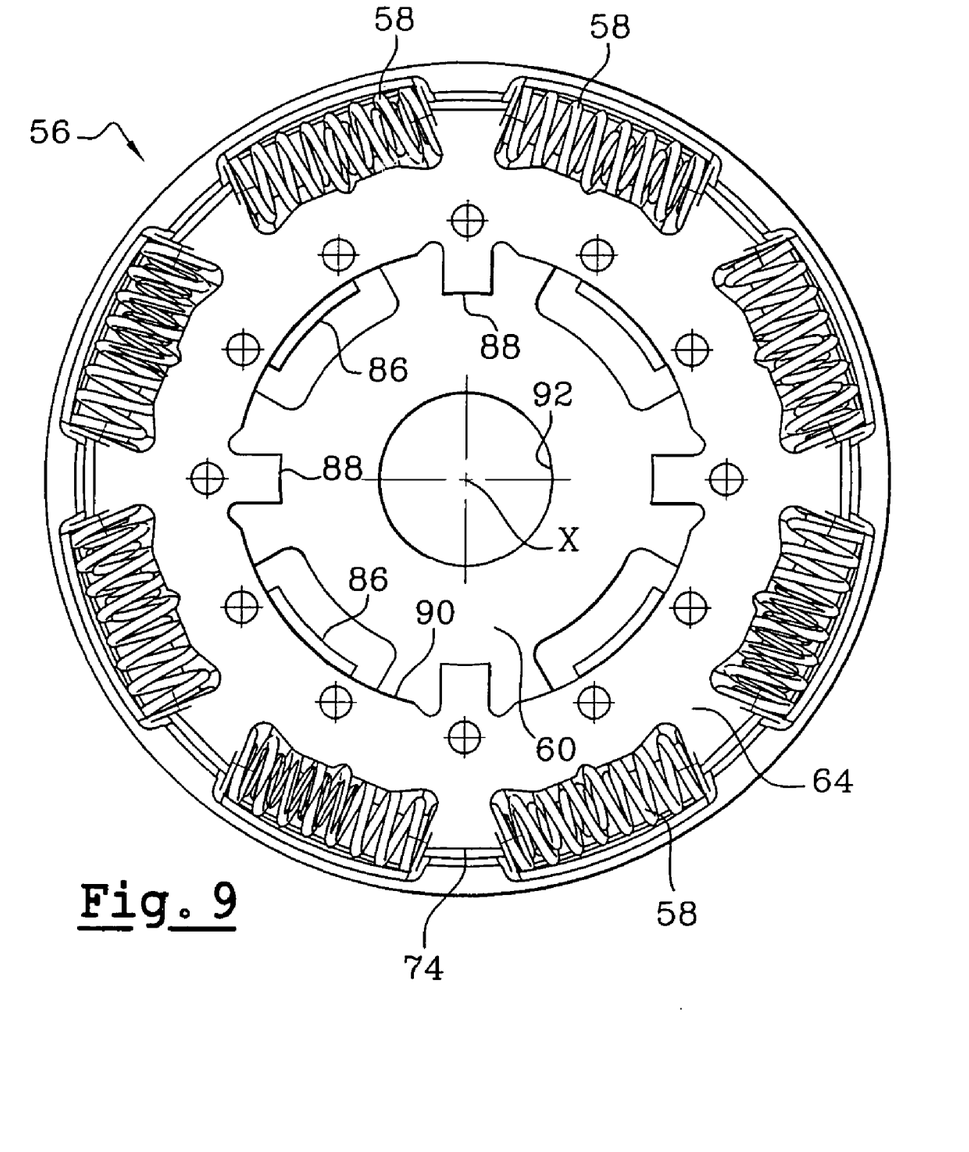
FIG. 9 is a view in the direction of the arrow 9, showing abutment elements for springs in the circumferential damping means of the hydrokinetic coupling means in the fourth embodiment of the invention.

With reference to FIGS. 7 and 9, it can be seen that the guide ring 60 and damper plate 64 are formed with complementary angular abutment elements 86, 88, for limiting relative angular travel between the guide ring 60 and damper plate 64.

The abutment elements 86 of the guide ring 60 consist of portions of the guide ring 60 pressed out and bent, in such a way as to constitute substantially axial lugs, which will be designated by the same reference numeral 86 as the angular abutment elements of the guide ring 60.

The lugs 86 cooperate with a circular internal contour 90 of the damper plate 64, for the purpose of centring the friction disc 54 with respect to the guide ring 60.

The angular abutment elements 88 of the damper plate 64 take the form of substantially radial lugs which extend the contour 90 towards the axis X.

The guide ring 60, which is generally a body of revolution, includes a central aperture 94 for fitting on the hub 16.

The guide ring 60 is coupled in rotation to the hub 16 and is immobilised axially with respect to the hub 16 by means 93A, 93B which are formed integrally with the guide ring 60 and hub 16. These coupling means, integral with the hub 16 and guide ring 60, may be formed, firstly by force-fitting of the toothed contour of the aperture 92 of the ring 60 over the hub 16, and secondly, by displacement of material in thrust mode (as a result of the force-fitting step) and seaming of the material of the hub 16 against the opposed faces of the guide ring 60.

With reference to FIG. 7, it will be noted that the plate 24 is immobilised axially with respect to the hub 16, on the one hand by an axial abutment element consisting for example of an elastic ring 94, carried by the hub 16 and co-operating with a first face of the plate 24, and secondly by the means 93A which are formed integrally with the hub 16 and which play a part in the axial immobilisation of the guide ring 60 with respect to the hub 16.

Sealing means, in particular an O ring 96, are preferably interposed axially between the plate 24 and the guide ring 60, so as to separate the control chamber 50 from the converter chamber 52.

It will be noted that the plate 24 and guide ring 60 are interleaved axially between the rolling bearings 28, 30, which act as axial abutments.

It will also be noted that the friction abutment 48 is fixed on the wall 38 which delimits the turbine wheel, for example with the aid of pads 98 which are formed integrally with the friction abutment 48. The pads 98 are inserted in complementary holes 100 formed in the wall 38 which delimits the turbine wheel.

FIG. 8 shows a modified version of the means for coupling the hub 16 in rotation with the plate 24 and the guide ring 60. In this version, the plate 24 is coupled in rotation to the hub 16 and immobilised axially with respect to the hub 16 by means which are formed integrally with the plate 24 and hub 16. These integral means are for example formed, firstly by force-fitting of the toothed contour of the aperture 80 of the plate 24 over the hub, and, secondly, by displacement of material in thrust mode (as a result of the force-fitting step) and seaming of the material of the hub 16 against the opposed faces of the plate 24.

The guide ring 60 is coupled in rotation to the hub 16 with the aid of means similar to those by which the plate portion 24 and damper plate 64 are connected together in the first embodiment of the invention, namely complementary axial splines 102 formed on the hub 16 and the central aperture 92 of the guide ring 60.

The procedure for assembly of the hydrokinetic coupling apparatus 12 shown in FIGS. 1 to 6, 8 and 9 is as follows. First, the circumferential damping means 56 and piston 36 are fitted in the casing 14. An assembly, consisting of the turbine wheel 18, the male member 44 of the sealing means, and the hub 16, is then fitted by telescopic engagement of the hub 16 with the damping output member 64; 60.

It will be noted that, in the case of the version shown in FIG. 5, the rebate 78 facilitates fitting of the abutment 48 by enabling the abutment 48 to be pre-centred on the male member 44, before the assembly comprising the turbine wheel 18, male member 44, sealing means and hub 16 is fitted.

The procedure for assembly of the hydrokinetic coupling apparatus shown in FIG. 7 is as follows.

First, the circumferential damping means 56, the hub 16 coupled to the damping output member (that is to say the guide ring 60) and the piston 36 are mounted within the casing 14. An assembly consisting of the turbine wheel 18 and the male member 44 of the sealing means is then fitted by telescopic engagement of this assembly over the hub 16.

Figure 10:
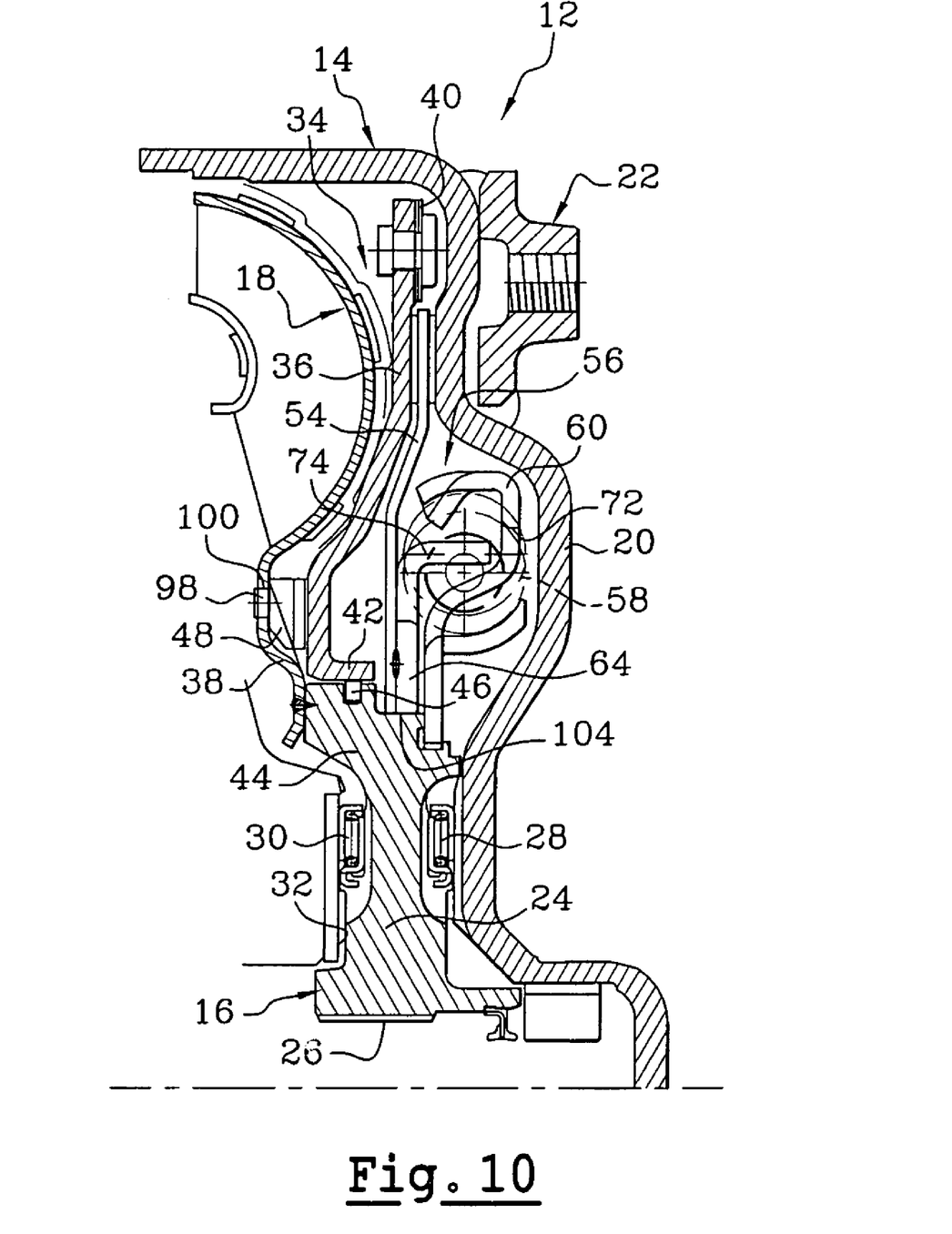
FIG. 10 is a half view of a hydrokinetic coupling apparatus in axial cross section.

FIG. 10 shows a hydrokinetic coupling apparatus 12. In FIG. 10, the elements that are similar to those in the foregoing Figures are designated by identical reference signs.

The apparatus 12 is arranged to couple together two shafts, namely a driving shaft and a driven shaft (not shown in the drawings), for example in an automatic transmission for a motor vehicle. In this case, the driving shaft is the output shaft of the engine of the vehicle, while the driven shaft is coupled to gear changing means.

As in the first embodiment of the invention, the hub 16 is formed with a substantially radial plate portion 24. This plate portion 24 is accordingly formed integrally with the hub 16. However, in the apparatus 12 shown in FIG. 10, the male member 44 of the sealing means is formed integrally with the periphery of the plate portion 24.

The circumferential damping means 56 are essentially similar to those shown in FIG. 7. However, in the apparatus 12 shown in FIG. 10, the damper plate 64 (that is to say the damping input member) is joined to the friction disc 54 by welding. The friction disc 54 and damper plate 64 are centred with respect to the plate portion 24 by being fitted over a peripheral engagement surface 104 of the plate portion.

In addition, in the apparatus 12 shown in FIG. 10, the guide ring 60 (that is to say the damping output member) is coupled in rotation to the plate portion 24 and is immobilised axially with respect to the plate portion 24, by means which are formed integrally with the guide ring 60 and plate portion 24. These coupling means, integral with the plate portion 24 and guide ring 60, may be made by seaming in a manner substantially similar to the way, described above, in which the hub 16 and plate 24, as shown in FIG. 7, are coupled together.

The wall 38 that delimits the turbine wheel is fixed on the plate portion 24, preferably by welding, for example by transparency welding using conventional means such as a laser. This transparency weld is produced by heating the face of the wall 38 opposed to the face of the wall 38 that is in contact with the plate portion 24.

For assembly of the hydrokinetic coupling apparatus 12 shown in FIG. 10, the procedure is as follows. First, the friction disc 54 and the circumferential damping means 56 are fitted around the plate portion 24 of the hub (the damper plate 64 having been welded to the friction disc 54 beforehand).

The guide ring 60 is then seamed on the plate portion 24.

Subsequently, the piston 36 being telescoped over the male member 44 of the plate portion 24, the piston 36 is coupled to the casing 14 by fastening the tongues 40.

Finally, the wall 38 delimiting the turbine wheel is transparency welded on the plate portion 24.

Among the advantages of the invention, it may be noted that the means for coupling the hub in rotation with the appropriate components of the coupling apparatus (that is to say the male member, the sealing means, the plate which connects the male member with the hub, or the damping output member) are easy to make and are inexpensive.

The invention claimed is:

1. A hydrokinetic coupling apparatus for coupling together a driving shaft and a driven shaft, the hydrokinetic coupling apparatus comprising:
    a casing (14) coupled to the driving shaft in rotation to an impulse wheel,
    a hub (16) coupled to the driven shaft and a turbine wheel (18),
    a lock-up clutch (34) for locking the coupling of the driving and driven shafts, the clutch comprising:
    a movable locking piston (36) which is displaceable axially between a wall (38) delimiting the turbine wheel (18) and a substantially radial locking wall (20) of the casing (14), against which the piston (36) is biased for locking the coupling,
    sealing means between two hydraulic chambers (50, 52) which are separated by the piston (36), the sealing means having a female member (42), coupled to the piston (36) and sliding axially around a complementary male member (44) formed separate from the hub (16),
    a friction disc (54) adapted to be gripped between the piston (36) and the locking wall (20),
    and circumferential damping means (56) which are provided with a damping input member (60A, 60B; 64) coupled to the friction disc (54), and with a damping output member (64; 60) which is coupled to the hub (16),
    wherein each of the male member (44) of the sealing means and the damping output member (64; 60) is attached on the hub (16) or carried by a member attached on the hub (16).

2. The hydrokinetic coupling apparatus according to claim 1, wherein the male member (44) of the sealing means is fixed, firstly to the wall (38) delimiting the turbine wheel (18), and secondly to the hub (16).

3. The hydrokinetic coupling apparatus according to claim 2, wherein the male member (44) of the sealing means is fixed to the wall (38) delimiting the turbine wheel (18) and to the hub (16) by welded joints.

4. The hydrokinetic coupling apparatus according to claim 1, in that wherein the male member (44) of the sealing means constitutes a substantially axial extension of the wall (38) that delimits the turbine wheel (18), the axial extension is formed unitarily with the turbine wheel wall (38) and is fixed to the hub (16).

5. The hydrokinetic coupling apparatus according to claim 4, wherein the substantially axial extension of the wall (38) that delimits the turbine wheel (18) is fixed to the hub (16) by a welded joint.

6. The hydrokinetic coupling apparatus according to claim 1, wherein the male member (44) of the sealing means is carried by a substantially axial extension (76) of the wall (38) delimiting the turbine wheel (18), the extension (76) is fixed to the hub (16).

7. The hydrokinetic coupling apparatus according to claim 6, wherein the male member (44) of the sealing means has a generally annular form and is force-fitted or snap-fitted around the substantially axial extension (76) of the wall (38) that delimits the turbine wheel (18).

8. The hydrokinetic coupling apparatus according to claim 1, wherein the damping output member (64) has a generally annular form and includes a central fitting aperture (66) for fitting over the hub (16), the output damping member (64) being coupled in rotation to the hub (16) by means of axial splines (68), which are formed on the contour of the damping member which delimits the fitting aperture (66), the said splines co-operating with complementary axial splines (70) formed on the hub (16).

9. The hydrokinetic coupling apparatus according to claim 1, further including a friction abutment (48) interposed between the wall (38) delimiting the turbine wheel (18) and the piston (36).

10. The hydrokinetic coupling apparatus according to claim 9, wherein the male member (44) of the sealing means is formed with a rebate (78) for centering the friction abutment (48) with respect to the substantially axial extension (76).

11. The hydrokinetic coupling apparatus according to claim 9, wherein the friction abutment (48) is formed integrally with the male member (44) of the sealing means.

12. The hydrokinetic coupling apparatus according to claim 9, wherein the friction abutment (48) is fixed on the wall (38).

13. The hydrokinetic coupling apparatus according to claim 1, wherein the circumferential damping means (56) comprise springs (58) working circumferentially and co-operating, firstly, with at least one annular abutment element which is referred to as the damping input engagement element, for abutment by the springs and fixed with respect to the damping input member (60A, 60B; 64), and, secondly, with an annular abutment element which is referred to as the damping output engagement element, for abutment by the springs and fixed with respect to the damping output member (64; 60).

14. The hydrokinetic coupling apparatus according to claim 13, wherein the damping input engagement element (60A) constitutes an extension of the friction disc (54).

15. The hydrokinetic coupling apparatus according to claim 13, wherein the damping output engagement element constitutes the damping output member (60).

16. The hydrokinetic coupling apparatus according to claim 13, wherein the input abutment element (64) and the damping output element (60) are formed with complementary angular abutment elements (88, 86) for limiting relative angular travel.

17. The hydrokinetic coupling apparatus according to claim 16, wherein the damping output engagement element (60) is formed with substantially axial lugs (86), which constitute end stops for limiting angular travel and are in cooperation with a circular internal contour (90) of the damping input abutment element (64), whereby to centre the friction disc (54) with respect to the said damping input abutment element (64).

18. The hydrokinetic coupling apparatus according claim 1 wherein the male member (44) of the sealing means carries a sealing liner in the form of a sealing segment (46) with radial elastic action, which is lodged in an annular groove of the male member (44).

19. A method for assembly of a hydrokinetic coupling apparatus according to claim 1, comprising the steps of:
    fitting the circumferential damping means (56) and piston (36) in the casing (14), and
    fitting an assembly comprising the turbine wheel (18), the male member (44) of the sealing means, and the hub (16), by telescopic engagement of the latter with the damping output member (64; 60).

20. A hydrokinetic coupling apparatus for coupling together a driving shaft and a driven shaft, the hydrokinetic coupling apparatus comprising:
    a casing (14) coupled to the driving shaft in rotation to an impulse wheel;
    a hub (16) coupled to the driven shaft and a turbine wheel (18);
    a lock-up clutch (34) for locking the coupling of the driving and driven shafts, the clutch comprising:
        a movable locking piston (36) which is displaceable axially between a wall (38) delimiting the turbine wheel (18) and a substantially radial locking wall (20) of the casing (14), against which the piston (36) is biased for locking the coupling;
        sealing means between two hydraulic chambers (50, 52) which are separated by the piston (36), the sealing means having a female member (42), coupled to the piston (36) and sliding axially around a complementary male member (44) coupled to the hub (16);
        a friction disc (54) adapted to be gripped between the piston (36) and the locking wall (20); and
        and circumferential damping means (56) which are provided with a damping input member (60A, 60B; 64) coupled to the friction disc (54), and with a damping output member (64; 60) which is coupled to the hub (16);
    wherein each of the male member (44) of the sealing means and the damping output member (64; 60) is attached on the hub (16) or carried by a member attached on the hub (16), and
    wherein the male member (44) of the sealing means is carried by a substantially axial extension (76) of the wall (38) delimiting the turbine wheel (18), the substantially axial extension (76) is fixed to the hub (16) by a welded joint.

21. A hydrokinetic coupling apparatus for coupling together a driving shaft and a driven shaft, the hydrokinetic coupling apparatus comprising:
    a casing (14) coupled to the driving shaft in rotation to an impulse wheel;
    a hub (16) coupled to the driven shaft and a turbine wheel (18);
    a lock-up clutch (34) for locking the coupling of the driving and driven shafts, the clutch comprising:
        a movable locking piston (36) which is displaceable axially between a wall (38) delimiting the turbine wheel (18) and a substantially radial locking wall (20) of the casing (14), against which the piston (36) is biased for locking the coupling;
        sealing means between two hydraulic chambers (50, 52) which are separated by the piston (36), the sealing means having a female member (42), coupled to the piston (36) and sliding axially around a complementary male member (44) coupled to the hub (16);
        a friction disc (54) adapted to be gripped between the piston (36) and the locking wall (20); and
        and circumferential damping means (56) which are provided with a damping input member (60A, 60B; 64) coupled to the friction disc (54), and with a damping output member (64; 60) which is coupled to the hub (16);
    wherein each of the male member (44) of the sealing means and the damping output member (64; 60) is attached on the hub (16) or carried by a member attached on the hub (16), and
    wherein the male member (44) of the sealing means is formed on a peripheral edge of a plate portion (24) connected to the hub (16), the plate portion (24) has the general form of a body of revolution and includes a central fitting aperture (80) for fitting over the hub (16).

22. The hydrokinetic coupling apparatus according to claim 21, wherein the plate (24) connected to the hub (16) is coupled in rotation to the said hub (16) by means of axial splines (82) formed on the contour of the plate portion (24) delimiting the fitting aperture, the said splines co-operating with complementary axial splines formed on the hub (16).

23. The hydrokinetic coupling apparatus according to claim 22, wherein the damping output member (60) has the general form of a body of revolution and has a central aperture (92) for fitting over the hub (16), the damping output member (60) being coupled in rotation to the hub (16) and immobilized axially with respect to the said hub (16) by means (93A, 93B) formed integrally with the damping output member (60) and hub (16).

24. The hydrokinetic coupling apparatus according to claim 23, wherein the plate (24) connected to the hub (16) is immobilized axially with respect to the said hub (16), firstly by means of an axial abutment which is defined by an elastic ring (94) carried by the hub (16), in cooperation with a first face of the plate (24) connected to the hub (16), and secondly, by means (93A) formed integrally with the hub (16) and participating in the axial immobilization of the damping output member (60) with respect to the said hub (16).

25. The hydrokinetic coupling apparatus according to claim 22, further comprising sealing means in the form of an O ring (96) interposed axially between the plate (24) connected to the hub (16) and the damping output member (60).

26. The hydrokinetic coupling apparatus according to claim 21, wherein the plate (24) connected to the hub (16) is coupled in rotation to the hub (16) and is immobilized axially with respect to the hub (16) by means which are formed integrally with the plate (24) and hub (16).

27. A method for assembly of a hydrokinetic coupling apparatus according to claim 22, comprising the steps of:

mounting the circumferential damping means (56) in the casing (14) with the hub (16) coupled to the damping output member (64; 60) and the piston (36), and fitting an assembly comprising the turbine wheel (18) and the male member (44) of the sealing means, by telescopic engagement of the assembly with the hub (16).

\* \* \* \* \*